United States Patent
Übel

[11] 4,143,842
[45] Mar. 13, 1979

[54] BRAKE CONTROL DEVICE TAKING INTO ACCOUNT DIFFERENT BRAKE ACTIVATING TIMES

[75] Inventor: Helmut Übel, Stuttgart, Fed. Rep. of Germany

[73] Assignee: International Standard Electric Corporation, New York, N.Y.

[21] Appl. No.: 830,375

[22] Filed: Sep. 2, 1977

[30] Foreign Application Priority Data
Sep. 4, 1976 [DE] Fed. Rep. of Germany ....... 2639950

[51] Int. Cl.² .......................... B61L 3/00; B60T 8/02
[52] U.S. Cl. ................................. 246/182 B; 303/93; 303/104
[58] Field of Search .................. 246/182 B, 187 B; 303/108, 109, 104, 93

[56] References Cited

U.S. PATENT DOCUMENTS 3,131,975  5/1964  Smith .................................. 303/104
3,829,167  8/1974  Rouf ...................................... 303/93

Primary Examiner—Trygve M. Blix
Assistant Examiner—Reinhard J. Eisenzopf
Attorney, Agent, or Firm—John T. O'Halloran; Robert A. Walsh

[57] ABSTRACT

The specification describes apparatus for applying automatic braking as a function of the effective deceleration of a vehicle caused by any already applied service braking whereby total braking time for the vehicle is shortened.

6 Claims, 3 Drawing Figures

BRAKE CONTROL DEVICE TAKING INTO ACCOUNT DIFFERENT BRAKE ACTIVATING TIMES

BACKGROUND OF THE INVENTION

The present invention relates to a device for controlling the brakes of a track-bound and particularly an automatically controlled vehicle.

On automatically controlled vehicles, provision of automatic braking is indispensible since the information transmission between the vehicle and the control center may suddenly be disturbed or interrupted. Such automatic braking is effected at the highest possible deceleration rate to keep the distance travelled by the vehicle out of control as short as possible. Automatic braking is also provided in front of signals and speed restrictions in case the stop position or the prescribed reduced speed is not observed or observed too late.

Since each automatic braking operation is detrimental to the vehicle and inconvenient to the passengers, any inadvertent automatic braking should be avoided, that is, all service braking actions in front of signals and speed restrictions should take place so early that the automatic brake will not be applied. In the speed-distance diagram (FIG. 1), this means that the service braking curve BE must not intersect the automatic brake application curve ZE.

When determining automatic brake application curves, it must be ensured that the automatically braked vehicle comes to a stop in front of the prescribed stopping point or reaches the prescribed reduced speed before the speed restriction begins. To accomplish this, it is necessary to take into account the braking distance given by the initial speed and the automatic braking deceleration rate and a braking distance governed by the so-called brake activating time. This brake activating time is the time required for a pneumatic brake to change from the unoperated condition to the fully effective condition. According to recommendations of a standards committee, this time may be up to 8.5 s in the case of freight trains. The brake activating time, during which the braking effect gradually builds up, is commonly taken into account in the form of a dead time Te, and it is assumed in a first order of approximation that no braking takes place during this dead time and that full brake power is applied abruptly at the end of the dead time.

Automatic braking is not often applied. Of the automatic brakings actually initiated, only a small part are genuine emergency brake applications. The largest part of all automatic brake applications take place after service braking when the brake system is already in the operated condition when the automatic brake is applied. If such additional braking distance occasioned by the brake activating time Te is plotted against the braking deceleration already effective at the application of the automatic brake, the curve shown in FIG. 2 is obtained. It can be seen that the additional braking distance BZ decreases with the increasing service braking deceleration rate B effective at the automatic braking initiation point.

SUMMARY OF THE INVENTION

The object of the invention is to provide a brake control device to avoid occasional unintentional braking or to shorten the running time and reduce distances between trains, in which case the probability of the occurrence of unintentional automatic braking remains the same.

The brake control device according to the invention includes on the vehicle, a control circuit which initiates an increase in deceleration caused by a vehicle braking system by applying an automatic braking system as a function of the then effective deceleration of said vehicle braking system. This shifts each automatic brake application curve following initiation of service braking in the direction of travel and thus considerably reduces the number of unintentional automatic brake applications. It is also possible to shift the service braking curve in the direction of travel without initiating more unintentional automatic brakings. This permits a faster approach to a stop or a speed restriction without any loss of safety and thus provides a saving of running time and allows shorter minimum distances between trains.

A portion of the control circuit provides a potential which is necessary to calculate automatic brake application curves and is proportional to the term $T_e[1-(B/B_{max})]$, where $T_e$ is the dead time corresponding to the maximum brake activating time, $B$ is the instantaneous deceleration, and $B_{max}$ is the maximum possible deceleration. Thus, a complicated dependence of the additional braking distance conditioned by the brake activating time on the deceleration effective immediately before the automatic brake application is replaced by a linear approximation shown as the straight line NG of FIG. 2. The dead time, $T_e$, and the maximum braking deceleration $B_{max}$ are constants for each specific type of vehicle; their quotient $T_e/B_{max}$ is a constant denoted as f.

The portion of the control circuit consists essentially of an amplifier and a following subtractor. The amplifier multiplies a potential value proportional to the measured value of the instantaneous deceleration by a vehicle-specific factor f; the subtractor subtracts the potential value obtained by the multiplication from a potential value proportional to the dead time $T_e$. This simple circuit is trouble-free and inexpensive.

The device according to the invention will now be described in more detail with reference to the accompanying drawings, in which:

DESCRIPTION OF THE PREFERRED EMBODIMENT

Figure 1:
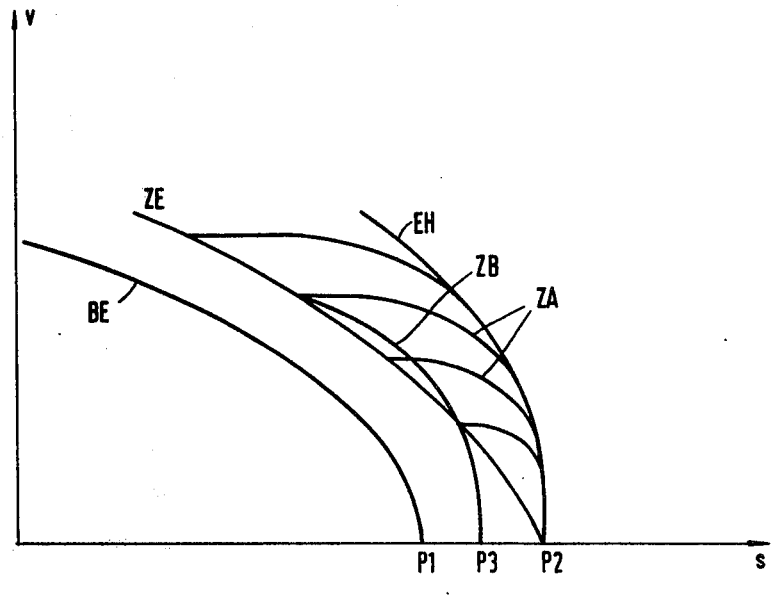
FIG. 1 shows brake application and braking curves in a speed-distance diagram.

FIG. 1 shows brake application and braking curves of the prior art in a speed-distance diagram. A service braking curve BE which is parabolic and meets the distance axis as a stopping point P1 is guarded by an automatic brake application curve ZE calculated on the vehicle from the instantaneous speed, the maximum possible deceleration, and a dead time Te according to the preassigned coordinates of the target point P2. After reaching the automatic brake application curve and provided that no service braking has taken place yet, the vehicle follows a curve of the family of automatic braking curves ZA whose envelope EH reaches the distance axis at the target point.

The automatic braking curves are initially nearly horizontal since the brake activating time does not permit full brake power to be applied immediately.

If service braking has been applied prior to the application of the automatic brake, part of the flat initial portion of the automatic brake application curve will be cancelled depending on the delay effective at the automatic braking initiation point as a result of the service braking, and the vehicle will follow a steeper braking curve ZB and will come to a stop in front of the target point P2, namely, at the point P3. This premature stop after automatic braking is unnecessary, and without any hazard to safety, the automatic brake application curve can be steepened, i.e. shifted in the direction of travel in higher speed ranges, until the point P3 coincides with the target point P2. This measure considerably reduces the number of unintentional automatic brakings. If no great importance is attached to such a reduction, the service braking curve can be shifted in the direction of travel until the previous distance to the automatic brake application curve is restored. This permits a faster approach to the target point P2 and thus provides a saving of time.

Figure 2:
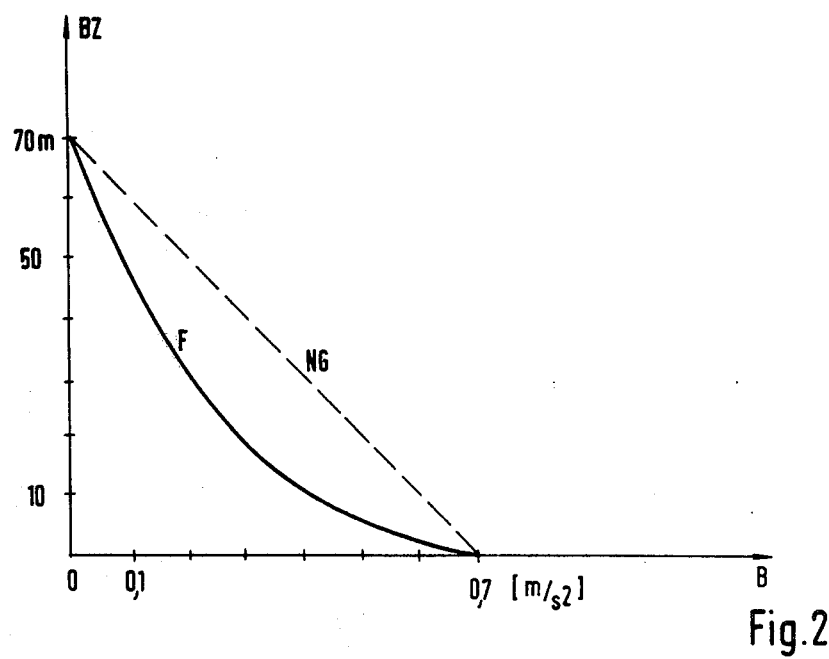
FIG. 2 shows the relationship between the braking distance conditioned by the brake activating time and the service braking retardation and FIG. 3 is a schematic diagram of the control circuit.

FIG. 2 shows the dependence of the additional braking distance BZ conditioned by the brake activating time on the service braking deceleration already effective at the automatic braking initiation point. The straight line NG represents a first degree of approximation to the quite complicated function F. The approximation takes place on the safe side and permits the dependence given by the function F to be taken into account by means of a simple circuit.

Figure 3:
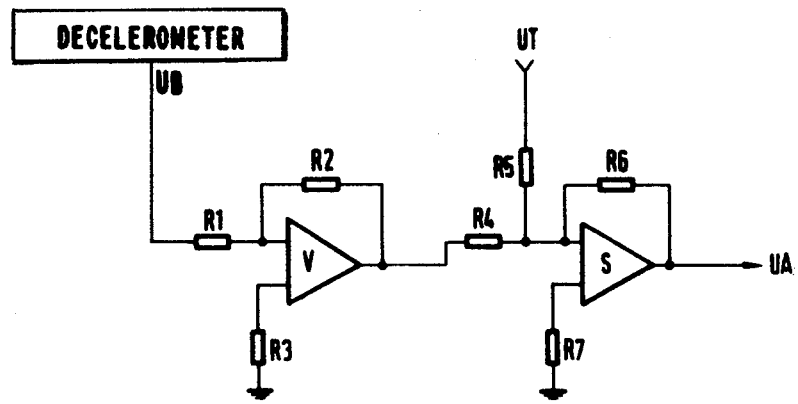

An embodiment of this circuit is shown in FIG. 3. An amplifier V and a subsequently arranged subtractor S are both formed by two operational amplifiers (e.g. of type 741). The amplifier V is connected to an input resistor R1, a feedback resistor R2, and to a resistor R3 which serves to balance the offset currents. The resistance values of R1 and R2 may vary within wide limits, and merely the ratio of R2 to R1 is defined and constitutes the gain factor which, in turn, is in proportion to the vehicle-specific ratio of dead time Te to the maximum braking deceleration rate Bmax. The resistance value of R3 is in proportion to that of a parallel arrangement of R1 and R2. The input potential UB of the amplifier V is taken from an acceleration measuring device and is in proportion to the instantaneously effective braking deceleration. This is multiplied in the amplifier by the gain factor R2/R1 = Te/Bmax and appears in inverted form at the output of the amplifier V. The subtractor S which is actually an adder circuit, to which the potential (R2/R1) · UB which is to be subtracted, is fed in inverted form, and contains two equal valued input resistors R4 and R5, as well as a likewise equal valued feedback resistor R6. The resistor R7, like the resistor R3 of the amplifier V, serves the balancing and its value is proportional to the parallel arrangement of the resistor R4, R5 and R6.

The potential UT, a source of constant voltage, represents the vehicle-specific dead time Te and is applied via one of the input resistors (R5). To this there is added via the other input resistor (R4), the output potential of the amplifier V, producing the inverted potential (R2/R1) · UB which is to be subracted. The result of the subraction, i.e. the potential UA, appears in inverted form at the output of the subtractor S. This potential is then further processed instead of the prior art potential UT (proportional to the dead time Te).

While I have described above the principles of my invention in connection with specific apparatus, it is to be clearly understood that this description is made only by way of example and not as a limitation to the scope of my invention as set forth in the objects thereof and in the accompanying claims.

I claim:

1. A device for controlling the brakes of a trackbound automatically controlled vehicle, comprising:

control means adapted to receive a first electrical signal, $U_B$, representative of the instantaneous change in velocity of the vehicle to increase the deceleration as a function of the instantaneous change in velocity, said control means includes a control circuit means which produces an electrical signal representative of the automatic brake application curves which is proportional to the term Te [1−(B/Bmax), where Te is a dead time corresponding to the maximum brake activating time, B is the instantaneous effective deceleration, and Bmax is the maximum possible deceleration.

2. The device of claim 1, wherein said control circuit means includes amplifier means which receives the first electrical signal for multiplying the first electrical signal by a vehicle-specific factor f, and subtractor means connected to said amplifier means for subtracting the potential value obtained by the multiplication from a potential value proportional to the dead time Te.

3. A device of claim 1, wherein the control circuit includes two resistors, $R_1$ and $R_2$, whose ratio ($R_2/R_1$) is proportional to the ratio of dead time Te and the maximum braking deceleration Bmax (Te/Bmax) which are determined by the characteristics of the specific type of vehicle.

4. A device of claim 3, wherein the control circuit is adapted to receive a second electrical signal representative of the dead time, Te, determined by the characteristics of the specific type of vehicle.

5. A device of claim 4, wherein the control circuit includes a first amplifier whose output is proportional to $(R_2/R_1)$ $U_B$.

6. A device of claim 5, wherein the output of the first amplifier is applied to a second amplifier having unitary gain which subtracts the second electrical signal to generate an output proportional to Te [1 − (B/Bmax)].

* * * * *